(12) United States Patent
Karaki et al.

(10) Patent No.: US 10,746,225 B2
(45) Date of Patent: Aug. 18, 2020

(54) PHOTOCURABLE RESIN COMPOSITION AND SLIDING MEMBER

(71) Applicant: MINEBEA MITSUMI Inc., Nagano (JP)

(72) Inventors: Tadahiko Karaki, Tomi (JP); Hirotaka Tohyama, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/366,067

(22) Filed: Mar. 27, 2019

(65) Prior Publication Data
US 2019/0301530 A1 Oct. 3, 2019

(30) Foreign Application Priority Data

Mar. 30, 2018 (JP) .................................. 2018-069672
Oct. 31, 2018 (JP) .................................. 2018-205397

(51) Int. Cl.

| | |
|---|---|
| *F16C 33/20* | (2006.01) |
| *F16C 23/02* | (2006.01) |
| *F16C 23/04* | (2006.01) |
| *C08L 27/18* | (2006.01) |
| *C08K 3/32* | (2006.01) |
| *C08K 5/37* | (2006.01) |
| *C08K 5/34* | (2006.01) |
| *C10M 135/20* | (2006.01) |

(52) U.S. Cl.
CPC .............. *F16C 33/201* (2013.01); *C08K 3/32* (2013.01); *C08K 5/34* (2013.01); *C08K 5/37* (2013.01); *C08L 27/18* (2013.01); *C10M 135/20* (2013.01); *F16C 23/02* (2013.01); *F16C 23/043* (2013.01); *C08K 2003/321* (2013.01); *F16C 2208/32* (2013.01); *F16C 2208/54* (2013.01)

(58) Field of Classification Search
CPC ...... F16C 33/201; F16C 23/02; F16C 23/043; F16C 43/02; F16C 2208/32; F16C 2208/58; C08K 3/32; C08K 5/34; C08K 5/37; C08K 2003/321; C08L 27/18; C10M 135/20
USPC ........ 384/261, 276, 282, 286, 300; 508/106, 508/161, 181; 427/520; 264/447
See application file for complete search history.

(56) References Cited

U.S. PATENT DOCUMENTS

| | | | | |
|---|---|---|---|---|
| 2003/0170521 A1* | 9/2003 | Zhang | ................. | H01M 8/1048 429/494 |
| 2013/0330539 A1* | 12/2013 | Ha | ......................... | C01B 25/372 428/328 |
| 2015/0051123 A1* | 2/2015 | Karaki | ................. | C08F 114/26 508/106 |
| 2015/0275125 A1* | 10/2015 | Karaki | ................. | C10M 147/02 384/300 |

(Continued)

FOREIGN PATENT DOCUMENTS

| | | | | |
|---|---|---|---|---|
| EP | 3252110 A1 * | 12/2017 | ............ | C08F 230/02 |
| JP | WO2013137087 A1 * | 8/2015 | ............ | C08G 75/04 |

(Continued)

*Primary Examiner* — Marcus Charles
(74) *Attorney, Agent, or Firm* — Pearne & Gordon LLP

(57) ABSTRACT

A photocurable resin composition for a self-lubricating liner contains a (meth)acrylate compound having an isocyanuric acid ring, a polytetrafluoroethylene resin and at least one of zirconium phosphate tungstate and zirconium phosphate.

12 Claims, 9 Drawing Sheets

(56) References Cited

U.S. PATENT DOCUMENTS

| | | | |
|---|---|---|---|
| 2016/0053130 A1* | 2/2016 | Suzuki | C09D 135/02 |
| | | | 428/216 |
| 2016/0215168 A1* | 7/2016 | Oda | H01L 23/49562 |
| 2016/0264778 A1* | 9/2016 | Masunaga | C08L 77/02 |
| 2017/0015923 A1 | 1/2017 | Karaki et al. | |
| 2017/0056924 A1* | 3/2017 | Takenaka | B05D 7/00 |
| 2017/0349851 A1 | 12/2017 | Tohyama et al. | |
| 2018/0362873 A1* | 12/2018 | Sasaki | C10M 171/00 |

FOREIGN PATENT DOCUMENTS

| | | | | |
|---|---|---|---|---|
| JP | 2016-056308 A | | 4/2016 | |
| JP | 2017203162 A | * | 11/2017 | ............ C08F 290/02 |
| JP | 2017-218572 A | | 12/2017 | |
| KR | 20150038554 A | * | 4/2015 | ............ C08F 283/00 |
| WO | 2013/161402 A1 | | 10/2013 | |
| WO | WO-2017099245 A1 | * | 6/2017 | .......... C10M 171/00 |

\* cited by examiner

PHOTOCURABLE RESIN COMPOSITION AND SLIDING MEMBER

CROSS REFERENCE TO RELATED APPLICATIONS

This application claims the benefit of Japanese Patent Application No. 2018-069672 and 2018-205397, respectively filed Mar. 30, 2018 and Oct. 31, 2018, which are hereby incorporated by reference in its entirety.

BACKGROUND

Technical Field

The present disclosure relates to a photocurable resin composition, and a sliding member having a sliding surface including a self-lubricating liner provided on the sliding surface, the self-lubricating liner formed from the photocurable resin composition.

Background

A sliding bearing having a sliding surface receiving a shaft has been used for a wide range of applications such as in aircraft, railroads, automobiles, and general industrial machines. In particular, a self-lubricating sliding bearing having a sliding surface including a self-lubricating liner provided on the sliding surface, and using no lubricating oil for the sliding surface has been used for applications requiring low friction coefficient, high durability, high load capacity, high heat resistance, and high oil resistance, and the like, such as ship and aircraft applications.

An aspect in which a liner layer having self-lubricating property is provided on a sliding surface is disclosed as one aspect of such a self-lubricating sliding bearing. For example, Japanese Patent Application Laid-Open No. 2017-218572 discloses an ultraviolet curable resin composition containing a (meth)acrylate compound having an isocyanuric acid ring, (meth)acrylate having a phosphoester group, a polythiol compound, and a polytetrafluoroethylene resin as a solid lubricant. The resin composition is used as a self-lubricating liner of a sliding member (for example, a spherical bearing, a sleeve bearing, etc.). Other aspect in which a resin composition containing a (meth)acrylate compound having an isocyanuric acid ring is used for a self-lubricating liner is also disclosed in International Publication No. 2013/161402 and Japanese Patent Application Laid-Open No. 2016-56308.

The self-lubricating liner used for the self-lubricating sliding bearing in aircraft application and the like is required to have wear resistance (a small wear loss) in a wide temperature range from a low temperature to a high temperature (for example, −55° C. to +163° C. in aircraft application). In particular, the wear loss of a spherical bearing having a spherical sliding surface is larger than that of a sleeve bearing having a cylindrical sliding surface, which requires further improvement in wear resistance under a low-temperature environment.

SUMMARY

The present disclosure relates to a photocurable resin composition for a self-lubricating liner. The photocurable resin composition contains a (meth)acrylate compound having an isocyanuric acid ring, a polytetrafluoroethylene resin and at least one of zirconium phosphate tungstate and zirconium phosphate.

BRIEF DESCRIPTION OF THE DRAWINGS

FIG. 2A is a longitudinal sectional view of the sleeve bearing cut along the axial direction of the sleeve bearing.

FIG. 2B is a lateral sectional view of the sleeve bearing cut along a direction perpendicular to the axis;

DETAILED DESCRIPTION

Figure 1:
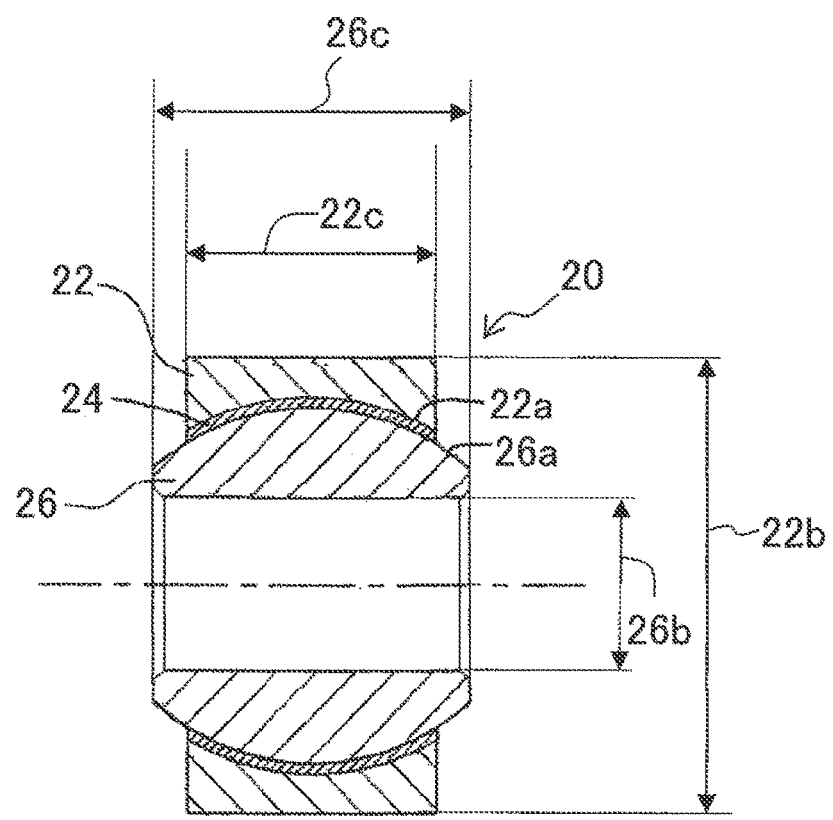
FIG. 1 is a schematic view illustrating the structure of a spherical bearing as an example of a sliding member of the present disclosure.

As described above, in view of improvement in the wear resistance of a self-lubricating liner under a low-temperature environment, the present inventors employed a composition in which a polytetrafluoroethylene resin as a solid lubricant is added to a base resin containing an acrylate compound having an isocyanuric acid ring as the formation material of a self-lubricating liner. Furthermore, zirconium phosphate tungstate and/or zirconium phosphate which has no precedent as the formation material of the self-lubricating liner hitherto is blended. The present inventors found for the first time that, when a self-lubricating liner formed from a material containing a new combination of an acrylate compound having an isocyanuric acid ring, a polytetrafluoroethylene resin, and at least one of zirconium phosphate tungstate and zirconium phosphate is applied to a sliding surface of a sliding member, the increase in wear loss is suppressed in the early stage of an oscillation test under a low-temperature environment. The present inventors found for the first time that the wear loss after the oscillation of 10,000 cycles is reduced to about ⅓ to 1/10 of that of a material not containing zirconium phosphate tungstate and zirconium phosphate, and oscillation torque in that case is also reduced.

Hereinafter, the present disclosure will be described in full detail.

[Photocurable Resin Composition]

A photocurable resin composition of the present disclosure contains: a (meth)acrylate compound having an isocyanuric acid ring, a polytetrafluoroethylene resin, and at least one of zirconium phosphate tungstate and zirconium phosphate.

[(Meth)Acrylate Compound Having Isocyanuric Acid Ring]

The photocurable resin composition contains a (meth)acrylate compound having an isocyanuric acid ring as a component cured by light irradiation [also referred to as isocyanurate having a (meth)acryloyl group]. The (meth)acrylate compound having an isocyanuric acid ring in the present disclosure has a function of imparting heat resistance to the photocurable resin composition.

In the present disclosure, the (meth)acrylate compound having an isocyanuric acid ring preferably has two or more, for example, two or three (meth)acryloyl groups. In the present disclosure, for example, a "(meth)acryloyl group" refers to both an acryloyl group and a methacryloyl group. The (meth)acryloyl group is also referred to as a (meth)acrylic group, and the (meth)acryloyloxy group is also referred to as a (meth)acryloxy group.

The (meth)acrylate compound having an isocyanuric acid ring used in the present disclosure is suitably a compound represented by the following formula (1).

[Chemical Formula 1]

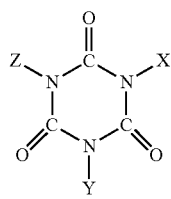

(1)

In the formula (1), X is a group containing a (meth)acryloyl group, and consisting solely of C, H, and O, and Y and Z are groups consisting solely of C, H, and O.

Y and Z may or may not contain a (meth)acryloyl group.

It is preferable that X is a (meth)acryloylethyl group, or a (meth)acryloxyethyl group modified by ε-caprolactone, and Y and Z are groups identical to X.

Preferable examples of the (meth)acrylate compound having an isocyanuric acid ring include bis(2-(meth)acryloyloxyethyl)hydroxyethylisocyanurate, di-(2-(meth)acryloxyethyl)isocyanurate, tris-(2-(meth)acryloxyethyl) isocyanurate, and ε-caprolactone-modified tris-(2-(meth) acryloxyethyl)isocyanurate.

Among them, more preferable examples of the compounds include di-(2-acryloxyethyl)isocyanurate (DAEIC), tris(2-acryloxyethyl)isocyanurate (TAEIC), ε-caprolactone-modified tris-(2-acryloxyethyl)isocyanurate (CTAI), and mixtures of these compounds.

The (meth)acrylate compound having an isocyanuric acid ring can be used in a proportion of 10% by weight to 50% by weight, for example, 15% by weight to 40% by weight with respect to the total weight of the photocurable resin composition. When the (meth)acrylate compound having an isocyanuric acid ring is used in a proportion of less than 10% by weight, resin fluidity tends to be insufficient, which makes the application of the resin composition difficult, and the strength of the liner tends to be insufficient. When the (meth)acrylate compound having an isocyanuric acid ring is blended in a proportion exceeding 50% by weight, the lubricating property tends to decrease due to a low content of a polytetrafluoroethylene resin which is a solid lubricant described later.

[Polytetrafluoroethylene Resin]

The photocurable resin composition of the present disclosure contains a polytetrafluoroethylene resin (hereinafter, also referred to as PTFE) as a component having the function of imparting lubricating property, i.e., a solid lubricant. The PTFE is a polymer of tetrafluoroethylene, and is represented by the general formula: $[C_2F_4]_n$ (n: degree of polymerization).

The shape of the PTFE is not particularly limited, and PTFEs in any form such as a powder form, a particle form (a spherical form, a polyhedral shape, a needle form), or a fibrous form may be used alone or in combination. For example, when the PTFE is in a particle form, the size of the particle is not particularly limited, but polytetrafluoroethylene having an average particle diameter of 0.5 to 200 μm, for example, can be used.

The PTFE may be surface-treated such that etching is performed on the surface of the PTFE by using sodium naphthalene and then the surface is coated with epoxy-modified acrylate. Such a surface treatment improves the affinity for an acrylic resin produced from the (meth)acrylate compound having an isocyanuric acid ring, and further strengthens the bond with the acrylic resin. Thus, the powder, particles, or fibers of the PTFE can be prevented from separating from the self-lubricating liner during sliding when the cured photocurable resin composition according to the present disclosure is used as the self-lubricating liner, and then the wear loss of the self-lubricating liner can be reduced.

The polytetrafluoroethylene resin can be used in a proportion of 20% by weight to 40% by weight with respect to the total weight of the photocurable resin composition. When the polytetrafluoroethylene resin is used in a proportion of less than 20% by weight, desired lubrication performance may be unsatisfied. When the polytetrafluoroethylene resin is blended in a proportion exceeding 40% by weight, the wear loss of the self-lubricating liner may increase.

[Zirconium Phosphate Tungstate, Zirconium Phosphate]

The photocurable resin composition of the present disclosure contains at least one of zirconium phosphate tungstate and zirconium phosphate.

Zirconium phosphate tungstate: $Zr_2(WO_4)(PO_4)_2$ (hereinafter, also referred to as ZWP) is a compound having a negative coefficient of linear expansion of about −3.0 ppm/K in a temperature range of 0 to 400° C.

Examples of zirconium phosphate (hereinafter, also referred to as ZP) include a compound having a chemical structure such as $(ZrO)_2P_2O_7$. Zirconium phosphate is a compound having a negative expansion coefficient of about −2.0 ppm/K in a temperature range of 30° C. to 500° C.

It is known that, when the compound having a negative expansion coefficient such as ZWP or ZP is used together with other material having a positive coefficient of linear expansion, the compound having a negative expansion coefficient has a function of suppressing the thermal expansion of the material due to temperature change. However, the present disclosure uses not the well known function of suppressing the change in the thermal expansion but a newly found function as a wear resistance imparting agent under a low-temperature environment of zirconium phosphate tungstate and zirconium phosphate.

The particle sizes of zirconium phosphate tungstate and zirconium phosphate are not particularly limited, and zirconium phosphate tungstate and/or zirconium phosphate having an average particle diameter of 0.1 to 100 μm, for example, can be used.

The amount of zirconium phosphate tungstate and/or zirconium phosphate blended is not particularly limited. Preferably, the at least one of zirconium phosphate tungstate and zirconium phosphate can be contained in a proportion of 0.1% by weight to 40% by weight with respect to the total weight (100% by weight) of the photocurable resin composition. For example, zirconium phosphate tungstate or zirconium phosphate can be used in a proportion of 0.1% by weight to 40% by weight with respect to the total weight of the photocurable resin composition. When zirconium phosphate tungstate and zirconium phosphate are used in combination, zirconium phosphate tungstate and zirconium phosphate can be used in a proportion of 0.1% by weight to 40% by weight as the total amount.

[Thiol Compound]

The photocurable resin composition of the present disclosure may further contain a thiol compound, such as a polythiol compound. The polythiol compound is reacted with a (meth)acrylate compound by any of light (ultraviolet light) and heat. Thus, when the photocurable resin composition is irradiated with ultraviolet light, for example, the polythiol compound and the (meth)acrylate compound are reacted with each other. When the reaction provides reaction heat, the reaction heat further accelerates the reaction between the polythiol compound and the (meth)acrylate compound. Thus, the polythiol compound can function as a curing reaction accelerator. When the cured product of the photocurable resin composition is manufactured, the presence of the polythiol compound makes it possible to complete the curing reaction even when the thickness of the cured product is large and the light is difficult to reach inside of the composition, or when the photocurable resin composition is colored by a dye contained in the photocurable resin composition.

Examples of the polythiol compound include, but are not particularly limited to, trimethylolpropane tris(3-mercaptopropionate), trimethylolpropane tris(3-mercapto butyrate), trimethylolpropane tris(3-mercaptoglycolate), trimethylolethane tris(3-mercaptobutyrate), pentaerythritol tetrakis(3-mercaptopropionate), pentaerythritol tetrakis(3-mercaptoglycolate), pentaerythritol tetrakis(3-mercaptobutyrate), dipentaerythritol hexakis(3-mercaptopropionate), ethylene glycol bis(3-mercaptoglycolate), butanediol bis(3-mercaptoglycolate), tris-[(3-mercaptopropionyloxy)-ethyl]isocyanurate, tetraethylene glycol bis(3-mercaptopropionate), 1,4-bis(3-mercaptobutyryloxy)butane, and 1,3,5-tris(3-mercaptobutyryloxyethyl)-1,3,5-triazine-2,4,6(1H,3H,5H)-trione. The compounds may be used alone or as a mixture of two or more. Among these, preferred are pentaerythritol tetrakis(3-mercaptobutyrate) and 1,3,5-tris(3-mercaptobutyryloxyethyl)-1,3,5-triazine-2,4,6-(1H,3H,5H)-trione.

The polythiol compounds are commercially available, and the commercial products which can be used include, but are not limited to: "TMTP" and "PETP" (manufactured by YODO KAGAKU CO., LTD.); "TEMPIC", "TMMP", "PEMP", "EGMP-4", "PEMP-II-20P" and "DPMP" (manufactured by SC Organic Chemical Co., Ltd.); Karenz MT (registered trademark) "NR1", "BD1", and "PE1" (manufactured by SHOWA DENKO K.K.).

When the thiol compound is used, the amount of the thiol compound blended may be 0.5% by weight to 5% by weight with respect to the total weight (100% by weight) of the photocurable resin composition. When the content of the thiol compound is less than 0.5% by weight, the curing reaction accelerating effect is insufficient. However, when the content of the thiol compound exceeds 5% by weight, the lubricating property may decrease due to a low content of the solid lubricant (PTFE and the like).

[Other (Meth)Acrylate Compound]

The photocurable resin composition of the present disclosure may contain other (meth)acrylate compound other than the (meth)acrylate compound having an isocyanuric acid ring. Other (meth)acrylate compound having no isocyanuric acid ring may have functions of, for example, imparting chemical resistance and toughness, facilitating curing reaction, modifying viscosity, improving adhesiveness, and imparting flexibility, but the functions of the other (meth)acrylate compound are not limited to only the above-mentioned functions.

The kind and blending amount of the other (meth)acrylate compound can be appropriately set according to the kind and blending amount of other components. For example, the total amount of the other (meth)acrylate compound can be set within a range of about 0.1 to 25% by weight with respect to the total weight of the photocurable resin composition.

As the other (meth)acrylate compound, epoxy (meth)acrylates can be contained alone or in combinations of two or more. The epoxy (meth)acrylate imparts chemical resistance without affecting strength after curing, that is, the epoxy (meth)acrylate can function as a chemical resistance imparting agent.

Examples of the epoxy (meth)acrylate include, but not limited to, modified bisphenol A-type epoxy acrylate and bisphenol A-type epoxy modified acrylate.

When the epoxy (meth)acrylate is used, the amount of the epoxy (meth)acrylate blended may be 20% by weight or less, for example, 1% by weight to 10% by weight with respect to the total weight of the photocurable resin composition. When the epoxy (meth)acrylate is blended in an amount exceeding 20% by weight, the cured product obtained by curing the photocurable resin composition may crack due to the rigid structure of the epoxy (meth)acrylate.

As the other (meth)acrylate compound, urethane (meth)acrylates can be contained alone or in combination of two or more.

As the urethane (meth)acrylate, polyfunctional urethane acrylate having a urethane group and two or more (meth)acryloyl groups can be used. For example, phenyl glycidyl ether acrylate hexamethylene diisocyanate urethane prepolymer, pentaerythritol triacrylate hexamethylene diisocyanate urethane prepolymer, pentaerythritol triacrylate isophorone diisocyanate urethane prepolymer, and dipentaerythritol pentaacrylate hexamethylene diisocyanate urethane prepolymer can be mentioned.

When the urethane (meth)acrylate is used, the amount of the urethane (meth)acrylate blended may be 10% by weight or less, for example, 1% by weight to 5% by weight with respect to the total weight of the photocurable resin composition.

As the other (meth)acrylate compound, polyfunctional, for example, trifunctional or higher (meth)acrylates having no isocyanuric acid ring (that is, having three or more (meth)acrylic group) can be contained alone or in combinations of two or more. The polyfunctional (meth)acrylate contains a plurality of functional groups as the starting points of a polymerization reaction, whereby the polyfunctional (meth)acrylate can accelerate the polymerization reaction (curing reaction) without impairing strength and heat resistance after curing, and can serve as a curing reaction accelerator.

Examples of the polyfunctional (meth)acrylate include pentaerythritol triacrylate, pentaerythritol tetraacrylate, dipentaerythritol penta(meth)acrylate, dipentaerythritol hexa(meth)acrylate, dipentaerythritol polyacrylate, and trimethylolpropane tri(meth)acrylate.

When the polyfunctional (meth)acrylate having no isocyanuric acid ring is used in combination, the amount of the polyfunctional (meth)acrylate having no isocyanuric acid ring blended may be 15% by weight or less, for example, 1% by weight to 15% by weight with respect to the total weight of the photocurable resin composition. When the polyfunctional (meth)acrylate having no isocyanuric acid ring is blended in an amount exceeding 15% by weight, the polyfunctional (meth)acrylate having no isocyanuric acid ring may lead to a rapid curing reaction, which may cause difficult handling when the cured product is manufactured.

As the other (meth)acrylate compound, (meth)acrylates having a hydroxy group can be contained alone or in combinations of two or more. The (meth)acrylate having a hydroxy group can have a function as a viscosity modifier (reactive diluent).

Examples of the (meth)acrylates having a hydroxy group include hydroxyethyl (meth)acrylate and hydroxypropyl (meth)acrylate.

When the (meth)acrylate having a hydroxy group is used, the amount of the (meth)acrylate having a hydroxy group blended may be 1% by weight to 20% by weight, for example, 2% by weight to 10% by weight with respect to the total weight of the photocurable resin composition.

As the other (meth)acrylate compound, one of (meth)acrylate having a phosphoester group and silicon (meth)acrylate can be contained alone, or (meth)acrylate having a phosphoester group and silicon (meth)acrylate can be contained in combination of two or more. These can function as an adhesion improver to metal, (that is, a sliding surface), and the silicon acrylate can function also as a flexibility imparting agent (component imparting plasticity and shock resistance).

Examples of the (meth)acrylate having a phosphoester group include phosphoric acid 2-(methacryloyloxy)ethyl and phosphoric acid 2-(acryloyloxy)ethyl.

Examples of the silicon (meth)acrylate include (meth)acrylic silane coupling agents such as 3-(meth)acryloxypropyltrimethoxysilane, 3-(meth)acryloxypropyltriethoxysilane, 3-(meth)acryloxypropylmethyldimethoxysilane, and 3-(meth)acryloxypropylmethyldiethoxysilane; and silicon diacrylate and silicon hexaacrylate.

When the (meth)acrylate having a phosphoester group and/or the silicon (meth)acrylate is used, the amount of the (meth)acrylate having a phosphoester group and/or the silicon (meth)acrylate blended may be 1% by weight to 10% by weight, for example, 1% by weight to 5% by weight in total with respect to the total weight of the photocurable resin composition. When the amount of the (meth)acrylate having a phosphoester group and/or the silicon (meth)acrylate is less than 1% by weight, an adhesion improving effect is insufficient. When the amount of the (meth)acrylate having a phosphoester group and/or silicon (meth)acrylate exceeds 10% by weight, the lubricating property may decrease due to a low content of a solid lubricant (PTFE and the like).

[Filler]

The photocurable resin composition of the present disclosure can contain fillers such as melamine cyanurate, glass fiber, and fumed silica.

<Melamine Cyanurate>

Melamine cyanurate has the function of the solid lubricant similarly to the above-mentioned PTFE. The use of the melamine cyanurate together with PTFE can reduce the friction coefficient of the cured product of the photocurable resin composition comparing to the case using PTFE alone. The melamine cyanurate has a cleavage structure in which the melamine molecule having a six-membered ring structure and cyanuric acid molecules are held together by hydrogen bond to be planarly arranged and the planes are stacked in layers by weak bonding. It is considered that such a structure contributes to the solid lubricating property.

The melamine cyanurate can be contained in a proportion of 30% by weight or less, for example, 1% by weight to 20% by weight with respect to the total weight of the photocurable resin composition. When the melamine cyanurate is blended in a proportion exceeding 30% by weight, the friction coefficient of the self-lubricating liner decreases, but the wear loss tends to increase, which is not desirable.

<Glass Fiber>

Glass fiber may be added to the photocurable resin composition according to the present disclosure to improve the strength of the self-lubricating liner. As the glass fiber, circular cross-section glass fiber having a circular cross-sectional shape and modified cross-section glass fiber having a non-circular cross-sectional shape may be used. In addition to the glass fiber, the photocurable resin composition according to the present disclosure may contain reinforcement fiber such as carbon fiber, aramid fiber, and potassium titanate whisker.

The glass fiber can be contained in an amount of 30% by weight or less, for example, 1% by weight to 30% by weight with respect to the total weight of the photocurable resin composition. When the content of the glass fiber exceeds 30% by weight, the wear on the surface of a mating material tends to be accelerated by the glass fiber cut at the time of cutting or grinding of the self-lubricating liner. This may compromise the advantages as the machinable liner. The glass fiber is suitable because the ultraviolet light transmissivity of the photocurable resin composition is not reduced.

<Fumed Silica>

Fumed silica is used to provide the thixotropy of the photocurable resin composition.

If a liner forming material has poor thixotropy, dripping may be caused when the liner forming material is applied on a place to be applied (sliding surface), which makes the formation of liner difficult. In such a case, the fumed silica can be added to adjust the thixotropy of the material, thereby improving the handling when the liner is formed.

The fumed silica can be contained in an amount of 5% by weight or less, for example, 1% by weight to 3% by weight with respect to the total weight of the photocurable resin composition. When the content of the fumed silica exceeds 5% by weight, the wear loss of the liner increases, which is not desirable.

[Additive]

The photocurable resin composition according to the present disclosure may further contain various additives such as an antioxidant, a preservation stabilizer, a polymerization initiator (photoinitiator, thermal initiator), a polymerization inhibitor, and a dye, optionally as necessary.

When the above-mentioned additives are used, these can be used in a proportion of 0.2% by weight to 10% by weight in total with respect to the total weight of the photocurable resin composition.

<Polymerization Initiator: Photopolymerization Initiator>

A photoinitiator has a function of accelerating the polymerization reaction of the photocurable resin composition due to light irradiation (ultraviolet light irradiation). The photoinitiator can be blended in a proportion of, for example, 0.1% by weight to 5% by weight with respect to the total weight of the photocurable resin composition. Examples of the photoinitiator include benzophenone, 4,4-bis(diethylamino)benzophenone, 2,4,6-trimethylbenzophenone, methylorthobenzoyl benzoate, 4-phenylbenzophenone, 2-t-butylanthraquinone, 2-ethylanthraquinone, 2-2-diethoxyacetophenone, 2-hydroxy-2-methyl-1-phenylpropan-1-one, benzyl dimethyl ketal, 1-hydroxycyclohexylphenylketone, benzoin methyl ether, benzoin ethyl ether, benzoin isopropyl ether, benzoin isobutyl ether, 2-methyl-[4-(methylthio)phenyl]-2-morpholino-1-propanone, 2-benzyl-2-dimethylamino-1-(4-morpholinophenyl)-1-butanone, 2,4-diethylthioxanthone, isopropylthioxanthone, diphenyl 2,4,6-trimethylbenzoylphosphine oxide, bis(2,6-di methoxybenzoyl)-2,4,4-trimethylpentyl phosphine oxide, bis(2,4,6-trimethylbenzoyl)phenylphosphine oxide, 2-hydroxy-1-{4-[4-(2-hydroxy-2-methylpropionyl)benzyl]phenyl}-2-methylpropan-1-one, methyl benzoylformate, 1,2-octanedion, 1-[4-(phenylthio)phenyl]-, 2-(O-benzoyloxime), and 1-[9-ethyl-6-(2-methylbenzoyl)-9H-carbazole-3-yl] ethanone 1-(O-acetyloxime). The above examples of the photoinitiator may be used alone or in combinations of two or more. The photoinitiator, however, is not limited to those.

<Polymerization Initiator: Thermal Initiator>

A thermal initiator has a function of accelerating the polymerization reaction due to heat, and can be blended in a proportion of, for example, 0.1% by weight to 5% by weight with respect to the total weight of the photocurable resin composition.

Examples of the thermal initiator include an azo polymerization initiator and an organic peroxide generating radicals due to heat. When the azo polymerization initiator or the organic peroxide is blended in the photocurable resin composition, the azo polymerization initiator or the organic peroxide generates radicals by the reaction heat of polymerization reaction caused by ultraviolet light irradiation, thus causing the polymerization reaction of (meth)acrylate. Thus, the polymerization reaction proceeds even in portions where ultraviolet light does not reach, such as the inner portion of the photocurable resin composition, allowing the resin composition to be completely cured.

Examples of the azo polymerization initiator include dimethyl-2,2'-azobis(2-methyl propionate), methyl-1,1'-azobis(1-cyclohexanecarboxylate), 2,2'-azobis(2-methyl-N-2-propenylpropaneamide), 2,2'-azobis(N-butyl-2-methylpropionamide), 1,1'-azobis(1-acetoxy-1-phenylethane), and dimethyl-2,2'-azobisisobutyrate. The above examples of the azo polymerization initiator may be used alone or in combinations of two or more. The azo polymerization initiator, however, is not limited to those.

Examples of the organic peroxide include methyl ethyl ketone peroxide, cyclohexanone peroxide, t-butyl hydroperoxide, cumene hydroperoxide, diisopropylbenzene hydroperoxide, 2,5-dimethylhexane-2,5-dihydroperoxide, p-menthane hydroperoxide, di-t-butyl peroxide, t-butyl cumyl peroxide, dicumyl peroxide, 2,5-dimethyl-2,5-bis(t-butyl peroxy)hexane, 2,5-dimethyl-2,5-di(benzyolperoxy)hexane, 1,1-bis(t-butyl peroxy)-3,3,5-trimethylcyclohexane, n-butyl-4,4-bis(t-butyl peroxy)valerate, t-butyl peroxylaurate, t-butylperoxy pivalate, t-butyl peroxybenzoate, t-butyl peroxyisopropylmonocarbonate, benzoyl peroxide, t-butyl peroxy-2-ethylhexanoate, 1,1,3,3-tetramethylbutyl peroxy-2-ethylhexanoate, t-amyl peroxy-2-ethylhexanoate, and t-butyl peroxyneodecanoate. The above examples of the organic peroxide may be used alone or in combinations of two or more. The organic peroxide, however, is not limited to those.

<Polymerizable Dye>

The photocurable resin composition according to the present disclosure may contain a polymerizable dye. The polymerizable dye is excellent in that it is less likely to dissolve in a solvent than an oil-based dye and a water-based dye. When conventional photocurable resin compositions contain the polymerizable dye, light is shielded by the polymerizable dye, which disadvantageously makes it difficult to completely cure the photocurable resin compositions. When the photocurable resin composition according to the present disclosure, however, contains the polythiol compound as described above, the polythiol compound contributes to the acceleration of the curing reaction. Thus, the photocurable resin composition according to the present disclosure can be completely cured even when it contains the polymerizable dye. As the polymerizable dye, "RDW-R13", "RDW-R60", "RDW-G01", and "RDW-B01" (manufactured by Wako Pure Chemical Industries, Ltd.) and the like can be used.

Since the photocurable resin composition according to the present disclosure is used by applying on the surface as described later, it is preferable that the photocurable resin is liquid at room temperature and has a viscosity easily handled (a viscosity allowing application and causing no dripping during application). The viscosity of the photocurable resin composition may be about 20 Pa·s to 100 Pa·s, for example, at room temperature.

[Sliding Member]

The present disclosure is also directed to a sliding member having a sliding surface including a self-lubricating liner provided on the sliding surface. The self-lubricating liner is formed by the cured product of the photocurable resin composition according to the present disclosure described above.

Examples of the sliding member include an aspect including first and second members sliding relatively with each other, and a liner provided on a sliding surface of the first or second member. Such a sliding member may be a spherical bearing, for example.

Other examples of the sliding member include an aspect including a cylindrical outer ring member and a liner formed on the inner peripheral surface (sliding surface) of the outer ring member. Such a sliding member may be a sleeve bearing, for example.

These sliding members can be manufactured through the step of applying the photocurable resin composition according to the present disclosure to the sliding surface of the first or second member, or the inner peripheral surface (sliding surface) of the outer ring member, and irradiating the photocurable resin composition with ultraviolet light to cure the photocurable resin composition, thereby forming the self-lubricating liner.

Hereinafter, preferred embodiments of the sliding member according to the present disclosure will be described in detail with reference to the accompanying drawings, but the present disclosure is not limited to the following embodiments.

FIG. 1 shows the cross-sectional view of a spherical bearing 20 having a spherical sliding surface in a diameter direction, the spherical bearing 20 being an example of a preferred sliding member according to the present disclosure.

The spherical bearing 20 includes an outer ring (race) 22 having a concave spherical inner peripheral surface 22a, an inner ring (ball) 26 having a convex spherical outer peripheral surface 26a, and a self-lubricating liner 24 formed on the inner peripheral surface 22a. The self-lubricating liner 24 is a resin layer having self-lubricating property, and is formed of a cured product of the photocurable resin composition according to the present disclosure.

The outer ring 22 and the inner ring 26 are made of metal such as bearing steel, stainless steel, aluminium alloy, or titanium alloy.

The spherical bearing 20 shown in FIG. 1 can be manufactured by, for example, the following process.

First, the photocurable resin composition according to the present disclosure is applied to the inner peripheral surface 22a of the outer ring 22, and the applied photocurable resin composition is then irradiated with ultraviolet light to cure the composition. Then, the cured product is finished by cutting, and the self-lubricating liner 24 having a predetermined thickness is formed. The liner thickness is not particularly limited. For example, it may be about 0.25 mm. Then, swage processing is performed, in which the inner ring member 26 is inserted into the outer ring member 22, and the outer ring 22 is pressed to plastically deform the outer ring 22 so as to follow the convex spherical surface of the inner ring 26. Finally, the outside of the outer ring 22 is finished by cutting, to complete the spherical bearing 20.

Figures 2A, 2B:
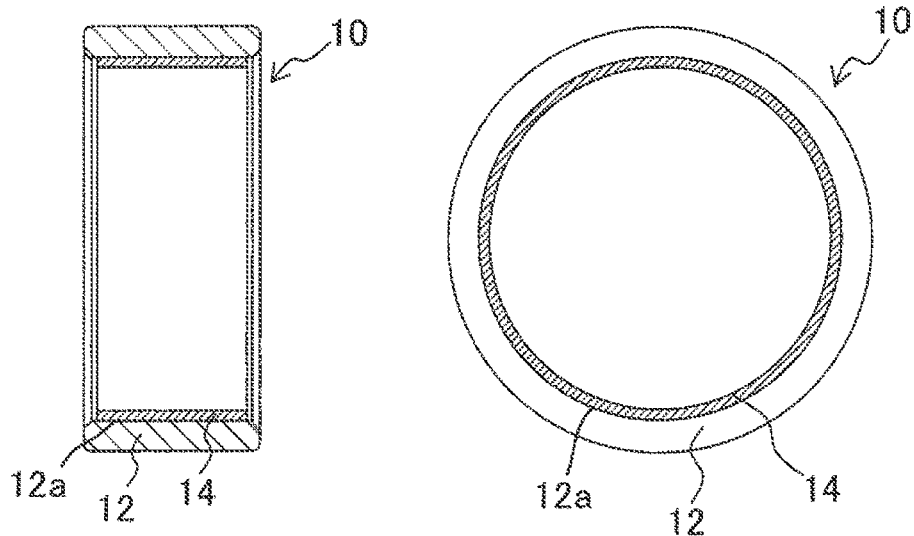
FIGS. 2A and 2B are schematic views illustrating the structure of a sleeve bearing as an example of the sliding member of the present disclosure.

FIG. 2A is a longitudinal sectional view of a sleeve bearing 10 cut along the axial direction of the sleeve bearing, the sleeve bearing 10 being an example of a preferred sliding member according to the present disclosure. FIG. 2B is a lateral sectional view of the sleeve bearing 10 cut along the direction perpendicular to the axis.

The sleeve bearing 10 includes a cylindrical outer ring 12 and a self-lubricating liner 14 formed on the inner peripheral surface of the outer ring 12. The self-lubricating liner 14 is a resin layer having self-lubricating property, and is formed of a cured product of the photocurable resin composition according to the present disclosure.

The cylinder outer ring 12 is made of metal such as bearing steel, stainless steel, aluminium alloy, or titanium alloy.

The self-lubricating liner 14 serving as sliding surface of the sleeve bearing 10 receives a shaft (not shown) which slides in relation to the sleeve bearing 10.

The sleeve bearing 10 shown in FIGS. 2A and 2B can be manufactured by, for example, the following process.

First, the photocurable resin composition according to the present disclosure is applied to the inner peripheral surface 12a of the outer ring member 12, and the applied photocurable resin composition is then irradiated with ultraviolet light to cure the composition. Then, the cured product is finished by cutting, and the self-lubricating liner 14 having a predetermined thickness is formed. The thickness of the liner is not particularly limited. For example, it may be about 0.25 mm.

The size of each of the self-lubricating liner 24 shown in FIG. 1 and the self-lubricating liner 14 shown in FIGS. 2A and 2B can be easily adjusted by cutting and/or grinding, and thus the self-lubricating liner may be referred to as a "machinable liner" (liner which is capable to be machined for size adjustment) as appropriate.

The sliding member to which the present disclosure is directed is not particularly limited and the sliding member can be any member having a sliding surface in at least a part of the member. Thus, as described above, the sliding member includes not only a spherical bearing and a sleeve bearing used for rotary motion or translational (linear) motion but also various other types of sliding members. These other types of sliding members are also the object of the present disclosure.

EXAMPLES

Hereinafter, the present disclosure will be described in more detail with reference to the Examples. However, the present disclosure is not intended to be limited to these Examples.

Components and abbreviations used for manufacturing photocurable resin compositions of Examples and Comparative Examples are as follows.

<(Meth)Acrylate Compound Having Isocyanuric Acid Ring>
 DAEIC: di-(2-acryloxyethyl)isocyanurate
 TAEIC: tris-(2-acryloxyethyl)isocyanurate
 CTAI: ε-caprolactone modified tris-(2-acryloxyethyl)isocyanurate

[Polytetrafluoroethylene Resin]
 PTFE; $D_{50}$ particle diameter: 130 μm, KT-60, manufactured by Kitamura Limited

[Zirconium Phosphate Tungstate]
 ZWP: zirconium phosphate tungstate, $D_{50}$ particle diameter: 1.3 μm, Cerafit, manufactured by Nippon Chemical Industrial Co., Ltd.

[Zirconium Phosphate]
 ZP: Zirconium Phosphate, median size: 1 to 2 μm, ULTEA WH2, manufactured by Toagosei Co., Ltd.

[Polythiol Compound]
 MTPE1: pentaerythritol tetrakis(3-mercaptobutyrate), Karenz MT (registered trademark) PE1, manufactured by Showa Denko K.K.
 MTNR1: 1,3,5-tris(3-mercaptobutyryloxyethyl)-1,3,5-triazine-2,4,6(1H,3H,5H)-trione, Karenz MT (registered trademark) NR1, manufactured by Showa Denko K.K.

[Other (Meth)Acrylate Compound]
 EA: epoxy acrylate, manufactured by EBECRYL (registered trademark) 3700, manufactured by Daicel-Allnex Ltd.
 UA: urethane acrylate, UA-510H, manufactured by Kyoeisha Chemical Co., Ltd.
 mfA: polyfunctional (meth)acrylate (trimethylolpropane triacrylate or dipentaerythritol hexaacrylate)

HEA: hydroxyethyl (meth)acrylate
PA: phosphoric acid (meth)acrylate, LIGHT ESTER P-1M, manufactured by Kyoeisha Chemical Co., Ltd.
SA: silicon (meth)acrylate, EBECRYL (registered trademark) 350, manufactured by Daicel-Allnex Ltd.

[Photopolymerization Initiator and Thermal Initiator]

PI (photopolymerization initiator): 2-hydroxy-2-methyl-1-phenylpropan-1-one, IRGACURE 1173, manufactured by BASF A.G.
TI (thermal polymerization initiator): VAm-110, manufactured by Wako Pure Chemical Industries, Ltd. (in the cases of Examples 1 to 13, 26 to 28, 32 and 33, and Comparative Examples 1 and 2); Perbutyl Z, manufactured by NOF Corporation (in the cases of Examples 14 to 25, 29 to 31, 34 and 35, and Comparative Examples 3 and 4)

[Filler]

GF: glass fiber (average fiber length 65 μm×average diameter ϕ11 μm, "SS05DE-413" manufactured by Nitto Boseki Co., Ltd.)
MC: melamine cyanurate (MELAPUR (registered trademark) MC25, manufactured by BASF A.G.)
HS: fumed silica (specific surface area: 150±25 m²/g, AEROSIL (registered trademark) R805, manufactured by BASF A.G.)

[Photocurable Resin Composition]

The photocurable resin compositions of Examples and Comparative Examples were prepared using components and contents (% by weight) described in Tables 1 and 2.

Examples 1 to 8 and Comparative Examples 1

The photocurable resin compositions of Examples 1 to 8 and Comparative Example 1 were prepared using DAEIC and TAEIC as a (meth)acrylate compound having an isocyanuric acid ring and additionally containing PTFE, ZWP and a polythiol compound. The content of ZWP in each of the photocurable resin compositions (proportion with respect to the total weight of the photocurable resin composition in each case) was 0% by weight in Comparative Example 1, 0.1% by weight in Example 1, 0.5% by weight in Example 2, 1% by weight in Example 3, 3% by weight in Example 4, 5% by weight in Example 5, 10% by weight in Example 6, 40% by weight in Example 7, and 3% by weight in Example 8.

Examples 9 to 13 and Comparative Example 2

The photocurable resin compositions of Examples 9 to 13 and Comparative Example 2 were prepared using CTAI as a (meth)acrylate compound having an isocyanuric acid ring, and additionally containing PTFE, ZWP and a polythiol compound. The content of ZWP in each of the photocurable resin compositions (proportion with respect to the total weight of the photocurable resin composition in each case) was 0% by weight in Comparative Example 2, 3% by weight in Example 9, 5% by weight in Example 10, 10% by weight in Example 11, 40% by weight in Example 12, and 3% by weight in Example 13.

Examples 14 to 19 and Comparative Example 3

The photocurable resin compositions of Examples 14 to 19 and Comparative Example 3 were prepatred using DAEIC and TAEIC as a (meth)acrylate compound having an isocyanuric acid ring, and additionally containing PTFE and ZWP. The content of ZWP in each of the photocurable resin compositions (proportion with respect to the total weight of the photocurable resin composition in each case) was 0% by weight in Comparative Example 3, 0.1% by weight in Example 14, 3% by weight in Example 15, 5% by weight in Example 16, 10% by weight in Example 17, 40% by weight in Example 18, and 3% by weight in Example 19.

Examples 20 to 25 and Comparative Example 4

The photocurable resin compositions of Examples 20 to 25 and Comparative Example 4 were prepared using CTAI as a (meth)acrylate compound having an isocyanuric acid ring, and additionaly containing PTFE and ZWP. The content of ZWP in each of the photocurable resin compositions (proportion with respect to the total weight of the photocurable resin composition in each case) was 0% by weight in Comparative Example 4, 1% by weight in Example 20, 3% by weight in Example 21, 5% by weight in Example 22, 10% by weight in Example 23, 40% by weight in Example 24, and 3% by weight in Example 25.

Examples 26 to 28

The photocurable resin compositions of Examples 26 to 28 were prepared using DAEIC and TAEIC as a (meth)acrylate compound having an isocyanuric acid ring, and additionally containing PTFE, ZP and a polythiol compound. The content of ZP in each of the photocurable resin compositions (proportion with respect to the total weight of the photocurable resin composition in each case) was 0.1% by weight in Example 26, 10% by weight in Example 27, and 20% by weight in Example 28.

Examples 29 and 30

The photocurable resin compositions of Examples 29 and 30 were prepared using DAEIC and TAEIC as a (meth)acrylate compound having an isocyanuric acid ring, and additionally containing PTFE and ZP. The content of ZP in each of the photocurable resin compositions (proportion with respect to the total weight of the photocurable resin composition in each case) was 0.1% by weight in Example 29 and 20% by weight in Example 30.

Example 31

The photocurable resin composition of Example 31 was prepared using CTAI as a (meth)acrylate compound having an isocyanuric acid ring, and additionally containing PTFE and ZP. The content of ZP in the photocurable resin composition of Example 31 (proportion with respect to the total weight of the photocurable resin composition) was 0.1% by weight.

Examples 32 and 33

The photocurable resin compositions of Examples 32 and 33 were prepared using DAEIC and TAEIC as a (meth)acrylate compound having an isocyanuric acid ring, and additionally containing PTFE, ZWP, ZP and a polythiol compound. The contents of ZWP and ZP in each of the photocurable resin compositions (proportion with respect to the total weight of the photocurable resin composition in each case) were 5% by weight in Example 32, and 0.05% by weight in Example 33.

Example 34

The photocurable resin composition of Example 34 was prepared using DAEIC and TAEIC as a (meth)acrylate compound having an isocyanuric acid ring, and containing PTFE, ZWP and ZP. The contents of ZWP and ZP in the photocurable resin composition of Example 34 (proportion with respect to the total weight of the photocurable resin composition) were 0.05% by weight.

Example 35

Prepared was a photocurable resin composition of Example 35 using CTAI as a (meth)acrylate compound having an isocyanuric acid ring, and containing PTFE, ZWP and ZP. The contents of ZWP and ZP in the photocurable resin composition of Example 35 (proportion with respect to the total weight of the photocurable resin composition) were 5% by weight.

TABLE 1

|  |  | Isocyanuric acid (meth)acrylate | | | | | Polythiol | | Other (meth)acrylate |
|---|---|---|---|---|---|---|---|---|---|
|  |  | DAEIC | TAEIC | CTAI | PTFE | ZWP ZP | MTPE1 | MTNR1 | EA |
| Examples | 1 | 8 | 19 |  | 40 | 0.1 | 2.9 |  |  |
|  | 2 | 9 | 21 |  | 35 | 0.5 |  | 1.5 |  |
|  | 3 | 10 | 22 |  | 30 | 1 |  | 2 |  |
|  | 4 | 9 | 21 |  | 30 | 3 | 1.5 |  |  |
|  | 5 | 11 | 25 |  | 30 | 5 |  | 1 |  |
|  | 6 | 12 | 26 |  | 20 | 10 | 0.5 | 0.5 |  |
|  | 7 | 5 | 11 |  | 20 | 40 | 5 |  |  |
|  | 8 | 9 | 21 |  | 30 | 3 | 1.5 |  | 3 |
|  | 9 |  |  | 23 | 20 | 3 | 1 |  |  |
|  | 10 |  |  | 36 | 30 | 5 |  | 1 |  |
|  | 11 |  |  | 42 | 30 | 10 | 0.5 |  |  |
|  | 12 |  |  | 10 | 30 | 40 |  | 0.5 |  |
|  | 13 |  |  | 33 | 30 | 3 |  | 1 | 3 |
|  | 14 | 9 | 20 |  | 40 | 0.1 |  |  | 4 |
|  | 15 | 10 | 23 |  | 40 | 3 |  |  | 3 |
|  | 16 | 10 | 22 |  | 35 | 5 |  |  | 3 |
|  | 17 | 9 | 21 |  | 35 | 10 |  |  | 4 |
|  | 18 | 5 | 11 |  | 25 | 40 |  |  | 6 |
|  | 19 | 9 | 21 |  | 35 | 3 |  |  |  |
|  | 20 |  |  | 38 | 30 | 1 |  |  | 2 |
|  | 21 |  |  | 33 | 40 | 3 |  |  | 3 |
|  | 22 |  |  | 32 | 40 | 5 |  |  | 3 |
|  | 23 |  |  | 30 | 35 | 10 |  |  | 4 |
|  | 24 |  |  | 13 | 25 | 40 |  |  | 3 |
|  | 25 |  |  | 32 | 40 | 3 |  |  |  |
| Comparative Examples | 1 | 10 | 23 |  | 30 | — | 1.5 |  |  |
|  | 2 |  |  | 41 | 30 | — |  | 1 |  |
|  | 3 | 12 | 28 |  | 35 | — |  |  | 4 |
|  | 4 |  |  | 53 | 25 | — |  |  | 8 |

|  |  | Other (meth)acrylate | | | | | Filler | | | Wear loss*1 |
|---|---|---|---|---|---|---|---|---|---|---|
|  |  | UA | mfA | HEA | PA&SA | PI&TI | GF | MC | HS | [mm] |
| Examples | 1 |  | 8 | 8 | 3 | 1 | 10 |  |  | 0.021 |
|  | 2 |  | 4 | 12 | 1 | 1 | 15 |  |  | 0.02 |
|  | 3 |  | 7 | 4 | 3 | 1 | 20 |  |  | 0.019 |
|  | 4 |  | 10 | 3 | 1.5 | 1 | 20 |  |  | 0.011 |
|  | 5 |  | 6 | 4 | 2 | 1 | 15 |  |  | 0.027 |
|  | 6 |  | 5 | 10 | 5 | 1 | 10 |  |  | 0.006 |
|  | 7 |  | 5 | 2 | 1 | 1 | 10 |  |  | 0.005 |
|  | 8 | 3 | 3 | 3 |  | 1 | 20 | 1.5 | 1 | 0.016 |
|  | 9 |  | 15 | 5 | 2 | 1 | 30 |  |  | 0.019 |
|  | 10 |  | 6 | 4 | 2 | 1 | 15 |  |  | 0.013 |
|  | 11 |  | 5 |  | 1.5 | 1 | 10 |  |  | 0.011 |
|  | 12 |  | 5 | 3 | 2.5 | 1 | 8 |  |  | 0.009 |
|  | 13 | 3 | 3 | 4 |  | 1 | 15 | 3 | 1 | 0.019 |
|  | 14 | 2.9 | 7 | 4 |  | 1 | 8 | 3 | 1 | 0.029 |
|  | 15 | 3 | 3 | 5 |  | 1 | 5 | 3 | 1 | 0.021 |
|  | 16 | 5 | 5 | 5 |  | 1 | 5 | 3 | 1 | 0.015 |
|  | 17 | 4 | 3 | 5 |  | 1 | 5 | 2 | 1 | 0.006 |
|  | 18 | 3 | 3 |  |  | 1 | 3 | 2 | 1 | 0.002 |
|  | 19 |  | 10 | 5 | 1.5 | 1 | 14.5 |  |  | 0.013 |
|  | 20 | 2 | 6 | 6 |  | 1 | 10 | 3 | 1 | 0.011 |
|  | 21 | 3 | 3 | 5 |  | 1 | 5 | 3 | 1 | 0.022 |
|  | 22 | 2 | 8 |  |  | 1 | 5 | 3 | 1 | 0.015 |
|  | 23 | 4 | 3 | 5 |  | 1 | 5 | 2 | 1 | 0.009 |
|  | 24 | 4 | 3 | 5 |  | 1 | 3 | 2 | 1 | 0.006 |
|  | 25 |  | 10 |  | 1.5 | 1 | 12.5 |  |  | 0.028 |
| Comparative Examples | 1 |  | 10 | 3 | 1.5 | 1 | 20 |  |  | 0.173 |
|  | 2 |  | 6 | 4 | 2 | 1 | 15 |  |  | 0.191 |
|  | 3 | 4 | 3 | 5 |  | 1 | 5 | 2 | 1 | 0.185 |
|  | 4 | 4 | 3 |  |  | 1 | 3 | 2 | 1 | 0.179 |

*Numerical values of components in Table 1 are proportions (% by weight) with respect to the total weight (100% by weight) of the photocurable resin composition.
*1Wear loss after 10,000 cycles in oscillation test [mm] (described later)

TABLE 2

| | | Isocyanuric acid (meth)acrylate | | | PTFE | ZWP | ZP | Polythiol | | Other (meth)acrylate |
|---|---|---|---|---|---|---|---|---|---|---|
| | | DAEIC | TAEIC | CTAI | | | | MTPE1 | MTNR1 | EA |
| Examples | 26 | 9 | 21 | | 40 | | 0.1 | 2 | | |
| | 27 | 8 | 20 | | 30 | | 10 | 1 | | |
| | 28 | 11 | 24 | | 20 | | 20 | | 3 | |
| | 29 | 11 | 26 | | 40 | | 0.1 | | | 3 |
| | 30 | 8 | 20 | | 20 | | 20 | | | 5 |
| | 31 | | | 33 | 40 | | 0.1 | | | |
| | 32 | 8 | 20 | | 30 | 5 | 5 | 1 | | |
| | 33 | 6 | 14 | | 40 | 0.05 | 0.05 | | 2 | 2.9 |
| | 34 | 9 | 22 | | 40 | 0.05 | 0.05 | | | 4 |
| | 35 | | | 35 | 30 | 5 | 5 | | | 4 |
| *[2] Comparative Examples | 1 | 10 | 23 | | 30 | — | | 1.5 | | |
| | 3 | 12 | 28 | | 35 | — | | | | 4 |
| | 4 | | | 53 | 25 | — | | | | 8 |

| | | Other (meth)acrylate | | | | | Filler | | | Wear loss*[1] |
|---|---|---|---|---|---|---|---|---|---|---|
| | | UA | mfA | HEA | PA&SA | PI&TI | GF | MC | HS | [mm] |
| Examples | 26 | | 6.9 | 3 | 2 | 1 | 15 | | | 0.056 |
| | 27 | | 6 | 5 | 4 | 1 | 15 | | | 0.045 |
| | 28 | | 5 | 3 | 1 | 1 | 12 | | | 0.036 |
| | 29 | 3 | 4 | 2 | | 1 | 6 | 2.9 | 1 | 0.061 |
| | 30 | 3 | 5 | 4 | | 1 | 9 | 4 | 1 | 0.041 |
| | 31 | | 6.9 | 5 | 2 | 1 | 12 | | | 0.049 |
| | 32 | | 6 | 5 | 4 | 1 | 15 | | | 0.035 |
| | 33 | 4 | 7 | 8 | | 1 | 10 | 4 | 1 | 0.037 |
| | 34 | 4.9 | 4 | 3 | | 1 | 8 | 3 | 1 | 0.03 |
| | 35 | 2 | 3 | 2 | | 1 | 7 | 5 | 1 | 0.046 |
| *[2] Comparative Examples | 1 | | 10 | 3 | 1.5 | 1 | 20 | | | 0.173 |
| | 3 | 4 | 3 | 5 | | 1 | 5 | 2 | 1 | 0.185 |
| | 4 | 4 | 3 | | | 1 | 3 | 2 | 1 | 0.179 |

*Numerical values of components in Table 2 are proportions (% by weight) with respect to the total weight (100% by weight) of the photocurable resin composition.
*[1]Wear loss after 10,000 cycles in oscillation test [mm] (described later)
*[2] Comparative Examples 1, 3, and 4 are relisted.

[Manufacture of Self-Lubricating Liner]

The spherical bearing 20 as shown in FIG. 1 was produced according to the procedure described in the previous section of [Sliding Member]. The photocurable resin composition was applied to the inner peripheral surface 22a of the outer ring member 22, and then irradiated with ultraviolet light at an integrated light amount of 1500 mJ/cm$^2$ or more to cure the composition.

In the spherical bearing 20, an outer ring (race) 22 obtained by heat-treating SUS630 and an inner ring (ball) 26 obtained by heat-treating SUS440C were used. Race outer diameter 22b: 25.4 mm, ball inner diameter 26b: 12.7 mm, race width 22c: 9.9 mm, ball width 26c: 12.7 mm, and thickness of liner 24: 0.25 mm were set.

Machinable liners (self-lubricating liner) formed of the cured product of the photocurable resin composition thus prepared in each of Examples 1 to 35 and Comparative Examples 1 to 4 were subjected to performance evaluation based on the following procedure. In the following description, the example number of the photocurable resin composition will be considered also as the example number of the performance evaluation of the self-lubricating liner.

[Oscillation Test]

The spherical bearings including the self-lubricating liner formed of the cured product of the photocurable resin composition of each of Examples 1 to 35 and Comparative Examples 1 to 4 were oscillated under a low-temperature environment (in a chamber holding a low temperature of −54° C. or less) to measure the wear loss of each of the self-lubricating liners. The test was carried out according to the following procedure using a test jig shown in FIG. 3.

<Test Procedure>

Figure 3:
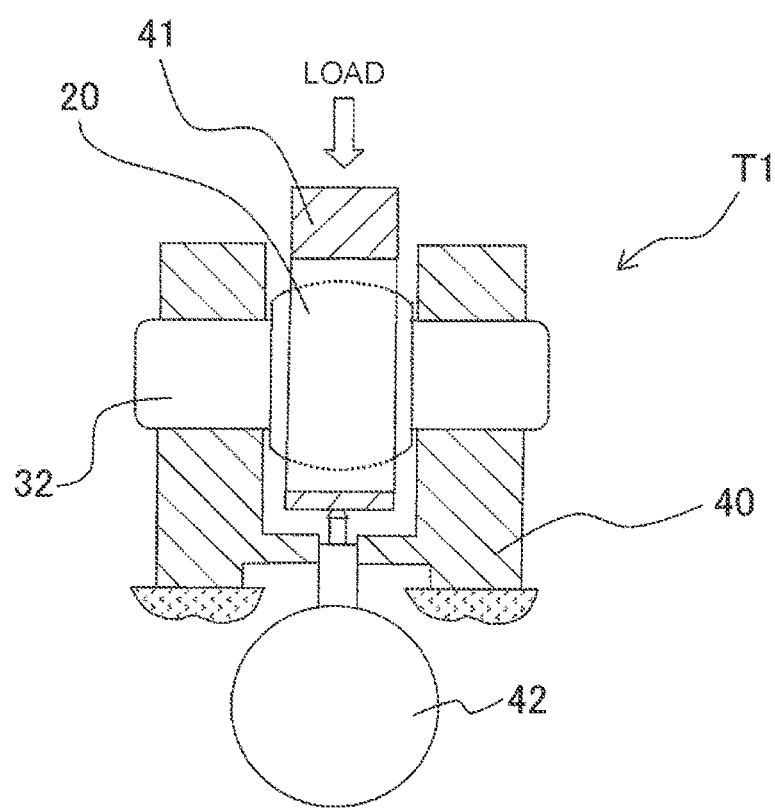
FIG. 3 shows the cross-sectional structure of a radial direction load test jig in which a spherical bearing manufactured in each of Examples is set.

As shown in FIG. 3, a test jig T1 includes a base portion 40 having an H-shaped cross section and supporting a shaft member 32, a housing 41 for applying the load in the radial direction of the spherical bearing 20 into which the shaft member 32 is inserted, and a dial gauge 42 provided below the base portion 40.

As shown in FIG. 3, the spherical bearing 20 was set on the test jig T1, and the load of 34.7 kN was applied in the radial direction and maintained statically for 15 minutes. After 15 minutes, the amount of displacement in the dial gauge 42 was set to zero and the oscillation of the shaft member 32 was started. The shaft member 32 was oscillated within an angle range of ±25 degrees. The movement of the shaft member 32 going from the angle position 0 degree to +25 degrees and coming back to 0 degree, and then going to −25 degrees and coming back again to 0 degree was counted as 1 cycle. The oscillation rate was set to 5 cycles or more per minute. During the oscillation test of 10,000 cycles, the wear loss was read from the dial gauge 42 at every predetermined cycles and recorded. For Examples 15 to 18 and 29 to 30 and Comparative Example 3, the average value of the oscillation torques in 1 cycle (the angle range of ±25 degrees) after 10,000 cycles was calculated.

The wear losses after 1,000 cycles, 5,000 cycles and 10,000 cycles for each of the self-lubricating liners of Examples 1 to 35 and Comparative Examples 1 to 4 are shown in Tables 3 and 4.

TABLE 3

| | Amount of ZWP [% by weight] | Amount of ZP [% by weight] | Wear loss [mm] Number of cycles | | |
|---|---|---|---|---|---|
| | | | 1,000 | 5,000 | 10,000 |
| Example 1 | 0.1 | — | 0.009 | 0.019 | 0.021 |
| Example 2 | 0.5 | — | 0.013 | 0.017 | 0.02 |
| Example 3 | 1 | — | 0.013 | 0.018 | 0.019 |
| Example 4 | 3 | — | 0.01 | 0.011 | 0.011 |
| Example 5 | 5 | — | 0.016 | 0.023 | 0.027 |
| Example 6 | 10 | — | 0.003 | 0.005 | 0.006 |
| Example 7 | 40 | — | 0.001 | 0.003 | 0.005 |
| Example 8 | 3 | — | 0.01 | 0.014 | 0.016 |
| Example 9 | 3 | — | 0.015 | 0.017 | 0.019 |
| Example 10 | 5 | — | 0.01 | 0.011 | 0.013 |
| Example 11 | 10 | — | 0.005 | 0.008 | 0.011 |
| Example 12 | 40 | — | 0.003 | 0.006 | 0.009 |
| Example 13 | 3 | — | 0.01 | 0.018 | 0.019 |
| Example 14 | 0.1 | — | 0.015 | 0.025 | 0.029 |
| Example 15 | 3 | — | 0.018 | 0.02 | 0.021 |
| Example 16 | 5 | — | 0.012 | 0.014 | 0.015 |
| Example 17 | 10 | — | 0.001 | 0.003 | 0.006 |
| Example 18 | 40 | — | 0.001 | 0.002 | 0.002 |
| Example 19 | 3 | — | 0.003 | 0.008 | 0.013 |
| Example 20 | 1 | — | 0.008 | 0.01 | 0.011 |
| Example 21 | 3 | — | 0.018 | 0.02 | 0.022 |
| Example 22 | 5 | — | 0.014 | 0.015 | 0.015 |
| Example 23 | 10 | — | 0.007 | 0.008 | 0.009 |
| Example 24 | 40 | — | 0.004 | 0.005 | 0.006 |
| Example 25 | 3 | — | 0.018 | 0.023 | 0.028 |

TABLE 4

| | Amount of ZWP [% by weight] | Amount of ZP [% by weight] | Wear loss [mm] Number of cycles | | |
|---|---|---|---|---|---|
| | | | 1,000 | 5,000 | 10,000 |
| Example 26 | — | 0.1 | 0.031 | 0.049 | 0.056 |
| Example 27 | — | 10 | 0.015 | 0.035 | 0.045 |
| Example 28 | — | 20 | 0.017 | 0.028 | 0.036 |
| Example 29 | — | 0.1 | 0.02 | 0.055 | 0.061 |
| Example 30 | — | 20 | 0.015 | 0.036 | 0.041 |
| Example 31 | — | 0.1 | 0.027 | 0.039 | 0.049 |
| Example 32 | 5 | 5 | 0.023 | 0.033 | 0.035 |
| Example 33 | 0.05 | 0.05 | 0.018 | 0.029 | 0.037 |
| Example 34 | 0.05 | 0.05 | 0.018 | 0.028 | 0.03 |
| Example 35 | 5 | 5 | 0.029 | 0.038 | 0.046 |
| Comparative Example 1 | — | — | 0.03 | 0.098 | 0.173 |
| Comparative Example 2 | — | — | 0.031 | 0.111 | 0.191 |
| Comparative Example 3 | — | — | 0.024 | 0.106 | 0.185 |
| Comparative Example 4 | — | — | 0.028 | 0.1 | 0.179 |

As shown in Table 4, the wear losses of Comparative Examples 1 to 4 not containing ZWP and/or ZP after the oscillation test of 10,000 cycles were 0.173 to 0.191 mm.

In contrast, the wear losses of Examples 1 to 25 containing 0.1% by weight to 40% by weight of ZWP with respect to the total weight of the resin composition (see Table 3) were 0.002 to 0.029 mm after the oscillation test of 10,000 cycles. The wear losses of Examples 26 to 31 containing 0.1% by weight to 20% by weight of ZP with respect to the total weight of the resin composition (see Table 4) were 0.036 to 0.061 mm after the oscillation test of 10,000 cycles. The wear losses of Examples 32 to 35 containing 0.1 to 10% by weight of ZWP and ZP in total with respect to the total weight of the resin composition (see Table 4) were 0.03 to 0.046 mm after the oscillation test of 10,000 cycles. Accordingly, the wear losses of all Examples were remarkably less than those of Comparative Examples.

That is, in the cured product of the photocurable resin composition according to the present disclosure containing the (meth)acrylate compound having an isocyanuric acid ring, the polytetrafluoroethylene resin, and at least one of zirconium phosphate tungstate and zirconium phosphate, it was confirmed that the wear loss under a low-temperature environment can be reduced without depending on the kind of the isocyanuric acid (meth)acrylate compound, the kind and presence or absence of the polythiol compound, and the kind and presence or absence of the other (meth)acrylate and filler.

Figure 4:
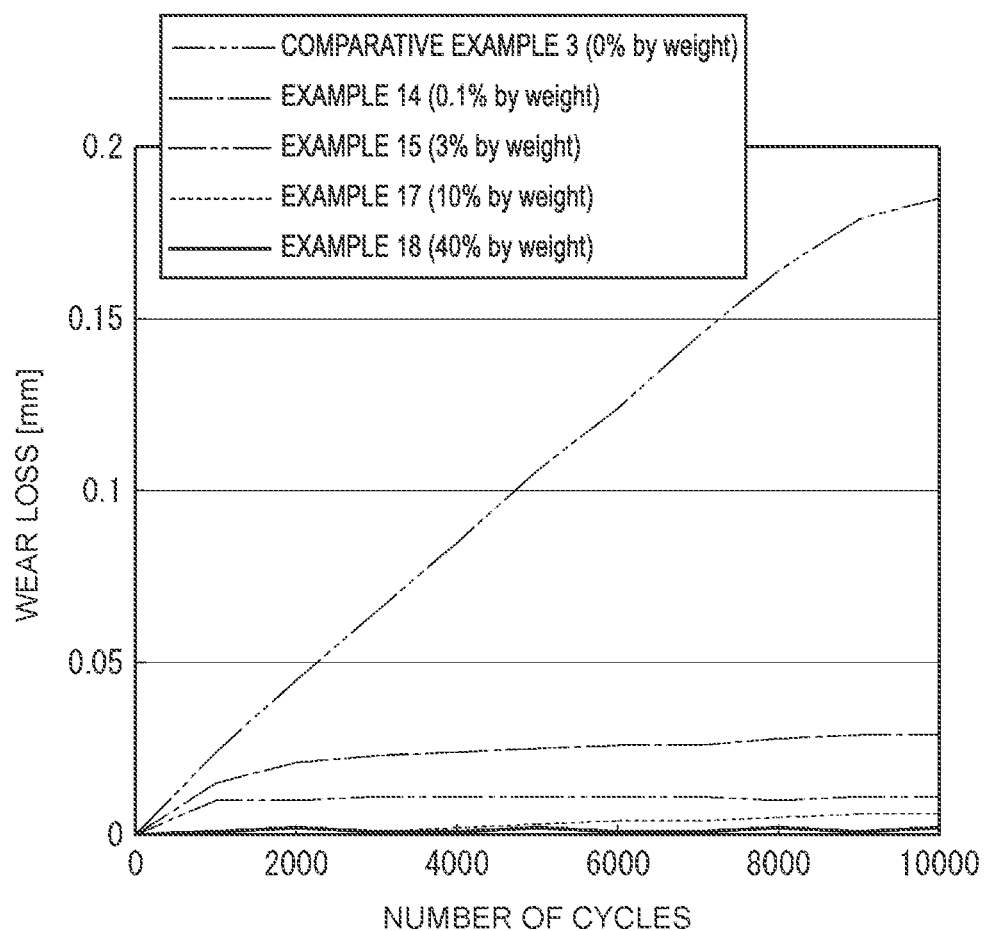
FIG. 4 is a graph showing the change in the wear loss of a self-lubricating liner with respect to the number of cycles of oscillation in an oscillation test of a spherical bearing including the self-lubricating liner formed from a photocurable resin composition prepared in each of Examples 14, 15, 17, and 18 and Comparative Example 3.

FIG. 4 shows the change in the wear loss with respect to the number of cycles of oscillation when the content of ZWP in the photocurable resin composition is changed. In order to make equal the components other than ZWP, FIG. 4 was prepared from the results corresponding to photocurable resin compositions containing DAEIC and TAEIC as (meth)acrylate compounds having an isocyanuric acid ring, PTFE and ZWP which are Comparative Example 3 (0% by weight), Example 14 (0.1% by weight), Example 15 (3% by weight), Example 17 (10% by weight), and Example 18 (40% by weight).

As shown in FIG. 4, in any of Examples and Comparative Example, the wear loss gradually increased from the start of oscillation. However, in the self-lubricating liner formed by the cured product of each of the photocurable resin compositions containing ZWP (Examples 14, 15, 17, and 18), the increase in the wear loss was suppressed after 1,000 cycles. Since then, the wear loss continued almost unchanged. In contrast, the self-lubricating liner formed of the cured product of the photocurable resin composition of Comparative Example 3 containing no ZWP exhibited the following behavior: the wear loss continuously increased even after completing 1,000 cycles from the start of oscillation test, and the wear loss started to be suppressed only after completing 8,000 cycles.

Figure 5:
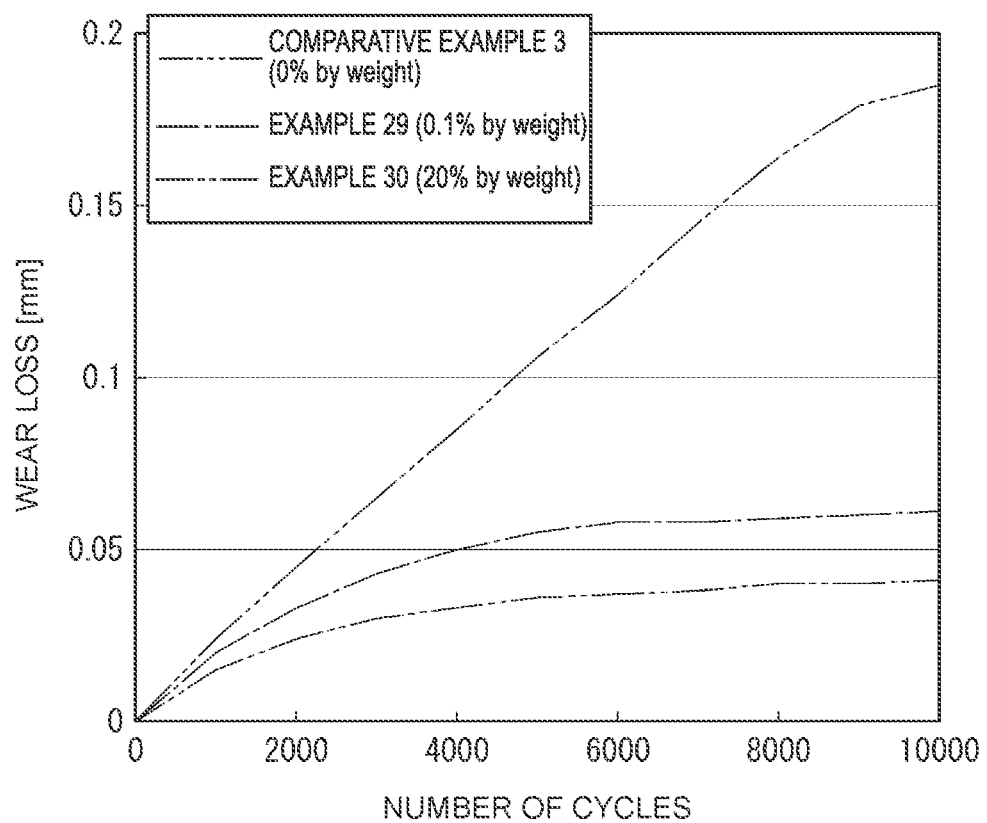
FIG. 5 is a graph showing the change in the wear loss of a self-lubricating liner with respect to the number of cycles of oscillation in an oscillation test of a spherical bearing including the self-lubricating liner formed from a photocurable resin composition prepared in each of Examples 29 and 30 and Comparative Example 3.

Similarly, FIG. 5 shows the change in the wear loss with respect to the number of cycles of oscillation when the content of ZP in the photocurable resin composition is changed. In order to make equal the components other than ZP, FIG. 5 was prepared from the results corresponding to photocurable resin compositions containing DAEIC and TAEIC as (meth)acrylate compounds having an isocyanuric acid ring, PTFE and ZP which are Comparative Example 3 (0% by weight), Example 29 (0.1% by weight) and Example 30 (20% by weight).

Also in FIG. 5, the wear loss continuously increased from the start of oscillation test in any of Examples and Comparative Example. However, in the self-lubricating liner formed of the cured product of each of the photocurable resin compositions containing ZP (Examples 29 and 30), the increase in the wear loss was gradually suppressed after 4,000 cycles, and the wear loss continued almost unchanged after 6,000 cycles.

Figure 6:
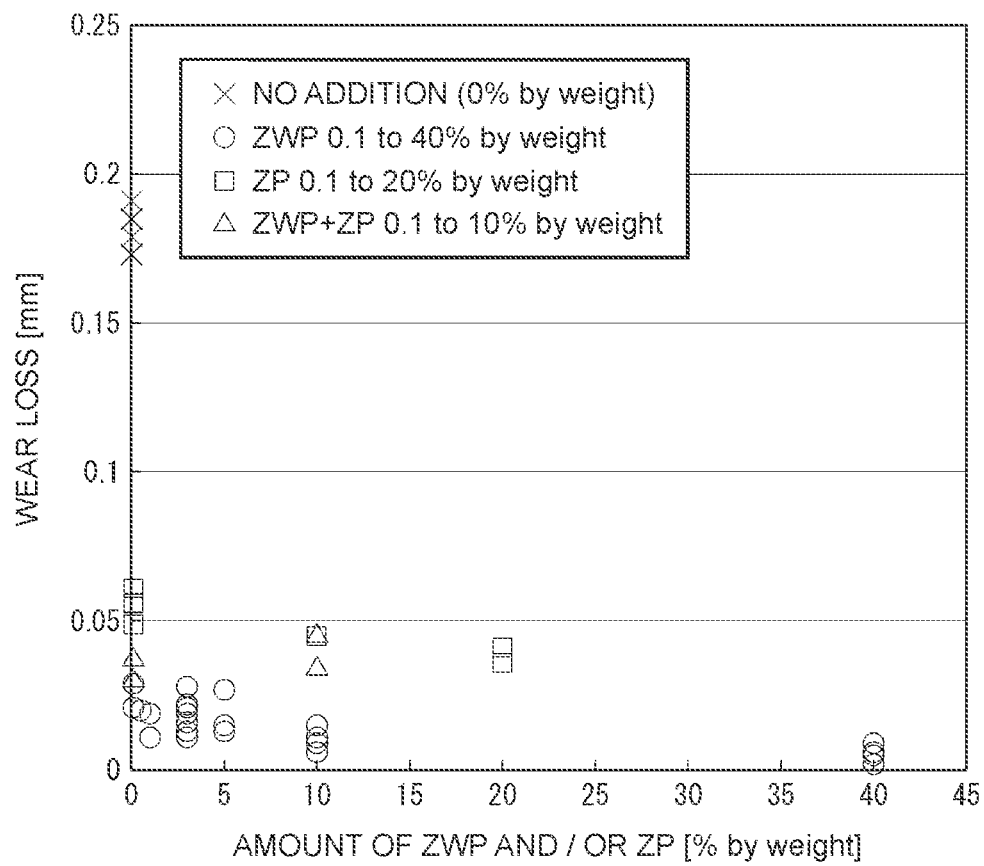
FIG. 6 is a graph obtained by plotting the wear loss of a self-lubricating liner after 10,000 cycles with respect to the content of zirconium phosphate tungstate (ZWP) and/or zirconium phosphate (ZP) (the total content in the case of combination use) in a photocurable resin composition in an oscillation test of a spherical bearing including the self-lubricating liner formed from the photocurable resin composition prepared in each of Examples 1 to 35 and Comparative Examples 1 to 4.
Figure 7:
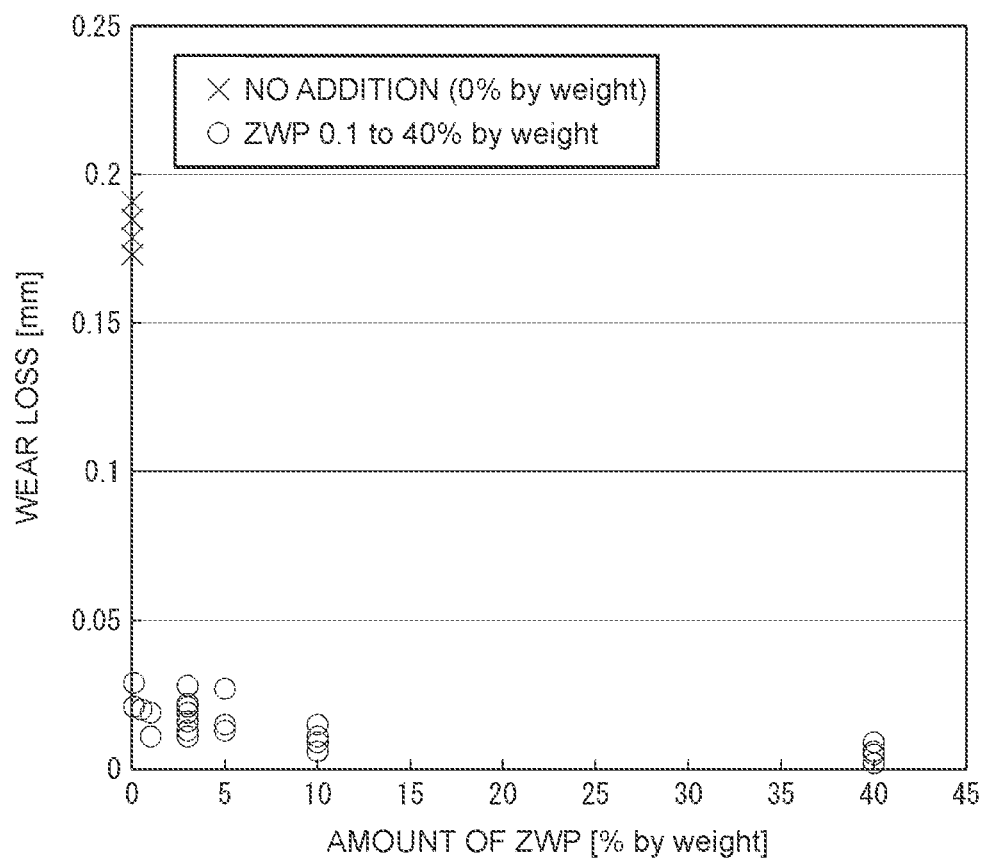
FIG. 7 is a graph obtained by plotting the wear loss of a self-lubricating liner after 10,000 cycles with respect to the content of zirconium phosphate tungstate (ZWP) in a photocurable resin composition in an oscillation test of a spherical bearing including the self-lubricating liner formed from the photocurable resin composition prepared in each of Examples 1 to 25 and Comparative Examples 1 to 4.
Figure 8:
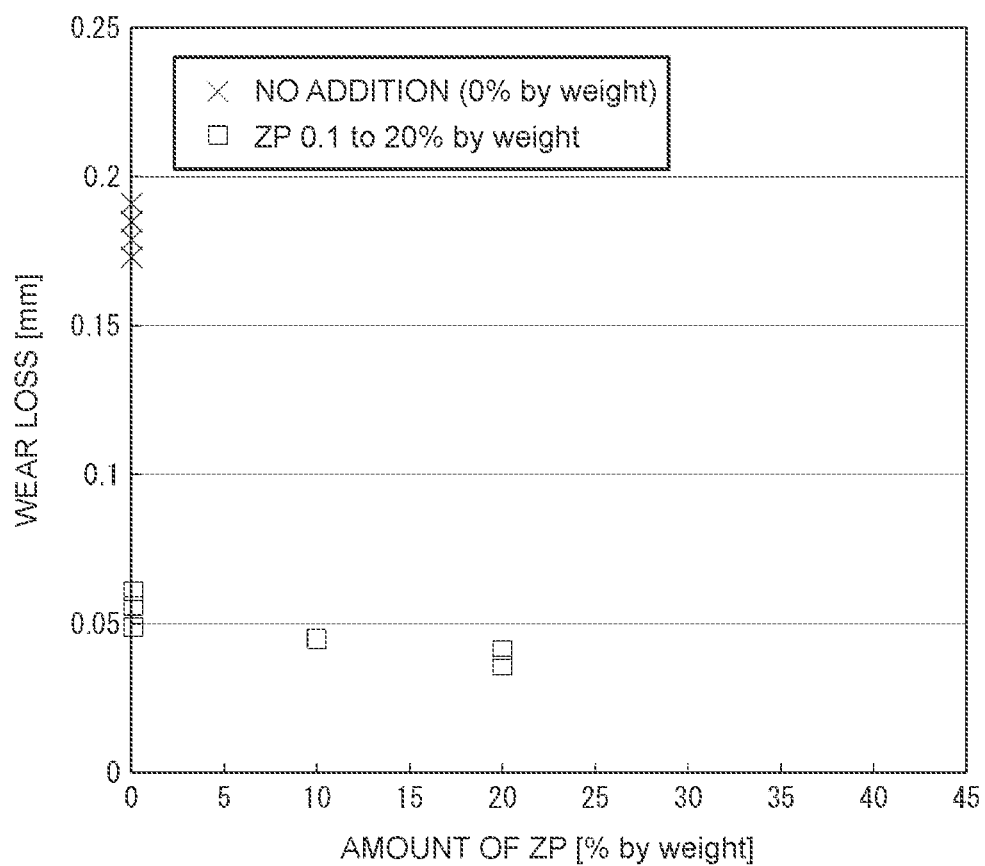
FIG. 8 is a graph obtained by plotting the wear loss of a self-lubricating liner after 10,000 cycles with respect to the content of zirconium phosphate (ZP) in a photocurable resin composition in an oscillation test of a spherical bearing including the self-lubricating liner formed from the photocurable resin composition prepared in each of Examples 26 to 31 and Comparative Examples 1 to 4.

Furthermore, FIGS. 6 to 8 show graphs obtained by plotting the wear losses after the oscillation test completing 10,000 cycles with respect to the amount of ZWP and/or ZP for the self-lubricating liners of Examples 1 to 35 and Comparative Examples 1 to 4. FIG. 6 is a diagram obtained by plotting the wear losses with respect to the amounts of ZWP and ZP (corresponds to the total amount added in the case of combination use) for Examples 1 to 35, and Comparative Examples 1 to 4. FIG. 7 is a diagram obtained by plotting the wear losses with respect to the amount of ZWP for Examples 1 to 25, and Comparative Examples 1 to 4.

FIG. 8 is a diagram obtained by plotting the wear losses with respect to the additive of ZP (Examples 26 to 31, Comparative Examples 1 to 4). In each of the diagrams, x represents no addition of ZWP and ZP (0% by weight); ○ represents addition of ZWP (0.1 to 40% by weight); □ represents addition of ZP (0.1 to 20% by weight); and 4 represents addition of ZWP and ZP (0.1 to 10% by weight).

As shown in FIGS. 6 to 8, even after the sliding bearing was oscillated in 10,000 cycles, the wear loss when ZWP was added was about 1/10 of the wear loss when ZWP and ZP were not added (0% by weight) (FIG. 7), and the wear loss when ZP was added was about 1/3 of the wear loss when ZWP and ZP were not added (FIG. 8). As shown in FIGS. 6 to 8, and Tables 3 and 4, the wear loss tended to decrease as the amounts of ZWP and ZP (the total amount in the case of combination use) increased.

Figure 9:
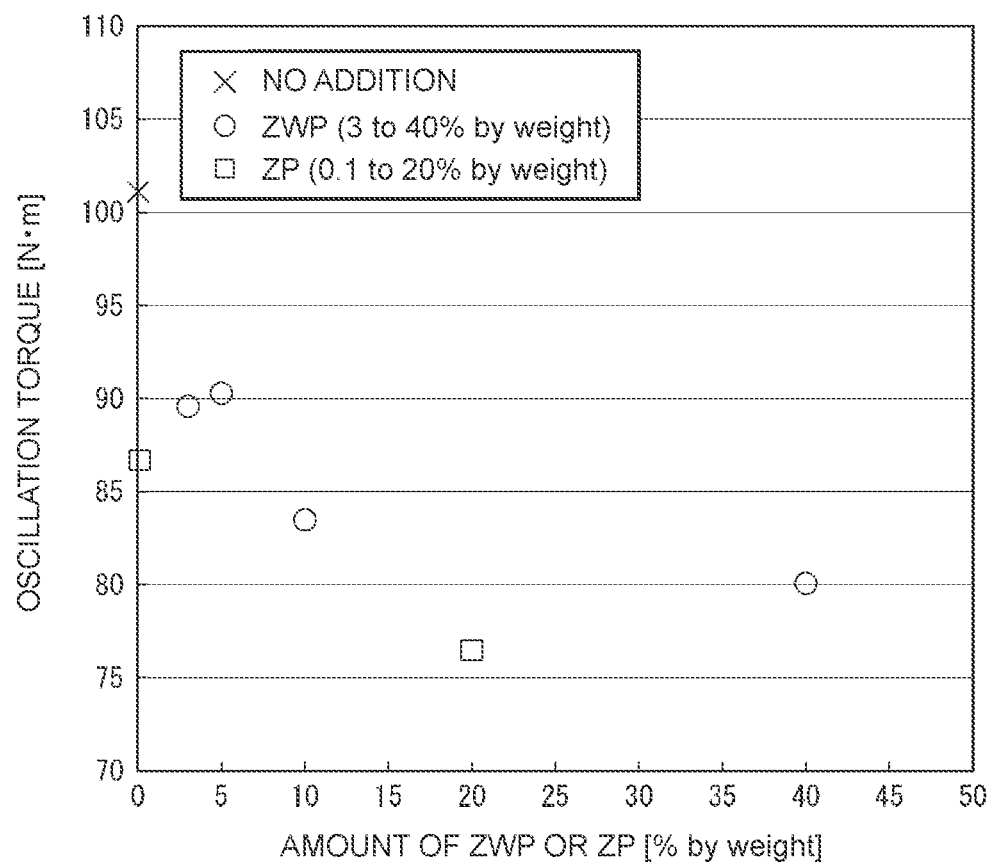
FIG. 9 is a graph obtained by plotting the average values of oscillation torque during 1 cycle after an oscillation of 10,000 cycles with respect to the content of zirconium phosphate tungstate (ZWP) or zirconium phosphate (ZP) in a photocurable resin composition in an oscillation test of a spherical bearing including the self-lubricating liner formed from the photocurable resin composition prepared in each of Examples 15 to 18, Examples 29 and 30, and Comparative Example 3.

FIG. 9 shows the change in the oscillation torque of the spherical bearings provided with each of the self-lubricating liners when the content of ZWP or ZP in the photocurable resin composition was changed. Similarly to the results shown in FIG. 4, in order to make equal the components other than ZWP or ZP, FIG. 9 was prepared from the results corresponding to photocurable resin compositions containing DAEIC and TAEIC as (meth)acrylate compounds having an isocyanuric acid ring and PTFE as common components, and additionally containing ZWP (Examples 15, 16, 17, and 18) or ZP (Examples 29 and 30), and also the result corresponding to photocurable resin composition not containing ZWP and ZP (Comparative Example 3). In FIG. 9, x represents no addition of ZWP and ZP (0% by weight); ○ represents addition of ZP (3 to 40% by weight); and □ represents addition of ZP (0.1 to 20% by weight).

As shown in FIG. 9, the oscillation torque when ZWP and ZP were added decreased in relation to the case where ZWP and ZP were not added, and as the amounts of ZWP and ZP increased, the reduction of oscillation torque tended to be more significant.

In respect of the photocurable resin composition according to the present disclosure, the at least one of zirconium phosphate tungstate (ZWP) and zirconium phosphate (ZP) is added to a base resin containing the (meth)acrylate compound having an isocyanuric acid ring, whereby the wear loss of the cured product of the composition under a low-temperature environment can be suppressed. For example, the photocurable resin composition containing ZWP or ZP provides the cured product having less wear loss under a low-temperature environment than that of a cured product not containing ZWP and ZP.

The self-lubricating liner formed of the cured product of the photocurable resin composition according to the present disclosure is provided on the sliding surface of the sliding member, whereby the oscillation torque of the sliding member under a low-temperature environment can be reduced.

In the present Examples, the oscillation test was carried out by using a standard spherical bearing having an inner ring (ball) with a spherical diameter of 12.7 mm, to evaluate the wear resistance and the oscillation torque. However, in the sliding member to which the present disclosure is directed, the spherical bearing is not limited to this size, and other size of the spherical bearing may be appropriately selected. The sliding member is not also limited to the spherical bearing, and may be any other sliding member conveniently selected according to the use. That is, the present disclosure can be applied to any sliding member having a sliding surface provided with a self-lubricating liner, and includes not only a sliding member for rotary motion but also a sliding member used for translational motion (linear motion), oscillating motion, and any combination of the sliding motions in any direction.

As described above, the preferred embodiments have been described in detail. The present disclosure is not limited to the embodiments described above, and includes modifications and improvements and the like as long as the object of the present disclosure can be achieved.

What is claimed is:

1. A photocurable resin composition for a self-lubricating liner, comprising:
   a base resin containing a (meth)acrylate compound having an isocyanuric acid ring;
   a polytetrafluoroethylene resin as a solid lubricant; and
   a particle of at least one of zirconium phosphate tungstate and zirconium phosphate, wherein the polytetrafluoroethylene resin and the particle of at least one of zirconium phosphate tungstate and zirconium phosphate are contained in the base resin.

2. The photocurable resin composition according to claim 1, wherein the photocurable resin composition further contains a thiol compound.

3. A sliding member having a sliding surface including a self-lubricating liner provided on the sliding surface, the self-lubricating liner formed of a cured product of the photocurable resin composition according to claim 2.

4. The sliding member according to claim 3, wherein the sliding member is a spherical bearing.

5. A sliding member having a sliding surface including a self-lubricating liner provided on the sliding surface, the self-lubricating liner formed of a cured product of the photocurable resin composition according to claim 1.

6. The sliding member according to claim 5, wherein the sliding member is a spherical bearing.

7. A photocurable resin composition for a self-lubricating liner, comprising:
   a base resin containing a (meth)acrylate compound having an isocyanuric acid ring;
   a powder, a particle or a fiber of polytetrafluoroethylene resin as a solid lubricant; and
   a particle of at least any one of zirconium phosphate tungstate and zirconium phosphate, wherein the polytetrafluoroethylene resin and the particle of at least one of zirconium phosphate tungstate and zirconium phosphate are contained in the base resin.

8. A sliding member having a sliding surface including a self-lubricating liner provided on the sliding surface, the self-lubricating liner formed of a cured product of the photocurable resin composition according to claim 7.

9. The sliding member according to claim 8, wherein the sliding member is a spherical sliding bearing.

10. The photocurable resin composition according to claim 7, wherein the photocurable resin composition further contains a thiol compound.

11. A sliding member having a sliding surface including a self-lubricating liner provided on the sliding surface, the self-lubricating liner formed of a cured product of the photocurable resin composition according to claim 10.

12. The sliding member according to claim 11, wherein the sliding member is a spherical bearing.

* * * * *